March 26, 1963 R. B. LAWRANCE 3,082,509

METHOD OF CONSTRUCTING MAGNETIC RECORDING DEVICES

Filed Sept. 10, 1959 2 Sheets-Sheet 1

INVENTOR.
RICHARD B. LAWRANCE

BY Henry L. Hanson

ATTORNEY

March 26, 1963 R. B. LAWRANCE 3,082,509

METHOD OF CONSTRUCTING MAGNETIC RECORDING DEVICES

Filed Sept. 10, 1959 2 Sheets-Sheet 2

INVENTOR.
RICHARD B. LAWRANCE

BY Henry L. Hanson

ATTORNEY 3,082,509

METHOD OF CONSTRUCTING MAGNETIC RECORDING DEVICES

Richard B. Lawrance, Winchester, Mass., assignor to Minneapolis-Honeywell Regulator Company, Minneapolis, Minn., a corporation of Delaware Filed Sept. 10, 1959, Ser. No. 839,198
7 Claims. (Cl. 29—155.5)

A general object of the present invention is to provide a new and improved electro-mechanical assembly suitable for use in recording electrical signals. More specifically, the present invention is concerned with a new and improved multi-channel recording head assembly and the method of fabricating the same, which is characterized by the uniformity that can be achieved in the manufacture of a number of like units and where the characteristics of the end product are adapted to have a uniform metallic surface to minimize any tendency for the head to wear an associated recording tape.

In order to obtain maximum use of a magnetic recording tape, and in order to record large amounts of data on a particular tape, it has been found that recording can be effected in an efficient manner by utilizing a multiple channel recording head assembly wherein each head of the assembly may be associated with a separate track or channel on the tape for recording purposes. Each recording head may well be constructed by utilizing a suitable ferromagnetic core structure having an air gap with the core being suitably energized by an electrical coil on the core. The application of electrical signals to the coil on the core will provide the desired variable flux condition at the air gap, which may be used to suitably excite a magnetic recording tape. When a plurality of recording heads are included in a single assembly for purposes of multiple channel recording, it is necessary that provision be made for the accurate spacing of the recording heads within the assembly, and that the resultant head assembly be formed with a uniform surface having good resistance to wear by the moving tape. It has been found that if the entire surface of the head assembly which is exposed to magnetic recording tape is metal (rather than being partially composed of plastic or the like), the resultant wear of the head is considerably reduced and any associated wear of the recording tape is likewise reduced.

It is accordingly a further more specific object of the present invention to provide a new and improved multiple channel recording head wherein the entire surface of the recording head which is exposed to the recording tape is metal.

In order to provide the desired spacing in a multiple channel recording head, there has been provided a new method of assembling a recording head whereby selected common sections of a plurality of recording heads in the assembly are uniquely mounted in a metal block, after which the excess metal is machined off. This method of assembly provides the desired spacing of the heads as well as a desired surface covering over the area of the head which is actively associated with the recording portion thereof.

Another object of the invention is therefore to provide a method of forming a portion of a multiple channel head assembly wherein a plurality of common pole pieces are mounted in suitable impressions in a metal block, with the excess metal subsequently being machined off, to provide the desired spacing and protection required on the exposed pole pieces.

In certain types of multiple channel recording heads, it is necessary that the recording gaps be staggered. A similar situation arises where one set of gaps is used for recording and another for playback, or where one set of gaps is used for erasing and another for recording and playback. In forming such a recording head assembly, it is necessary that certain portions of the pole pieces associated with the staggered gap or separated gap lines be chamfered so as to minimize the effect of any magnetic fields at the edge of one of the pole pieces of each recording head which is away from the recording gap. In order to form a staggered gap recording head of this type, it is necessary that a special provision be made for the mounting of the pole pieces which carry the chamfered edge.

In accordance with the teachings of the present invention, the mounting and spacing of a portion of the recording assembly which carries pole pieces having a chamfered edge is accomplished by die stamping or otherwise engraving a suitable series of impressions in a metal block where each impression is adapted to mate with the associated pole piece of the recording head. Once the impressions have been formed, the related pole pieces may be mounted in position and then the excess metal may be machined away from the pole piece so that the final product will comprise a plurality of spaced pole pieces suitably mounted and spaced with a metallic external end surface as well as a desired recording gap surface.

It is therefore a still further object of the invention to provide a new and improved multiple channel recording head utilizing pole pieces having a chamfered edge wherein said pole pieces are adapted to be mounted in a block having a mating impression therein corresponding to the related pole piece, and wherein the block is adapted to be machined down to a point where the pole piece is exposed on the end thereof and at the sides thereof in a desired manner.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
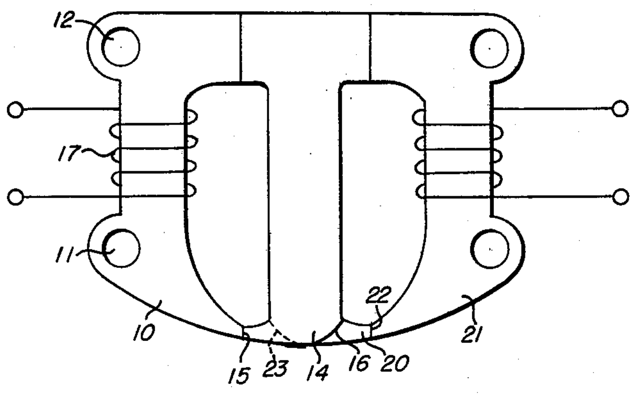
FIGURE 1 is a diagrammatic showing of a multiple head recording assembly which is adapted to utilize the principles of the present invention.

Referring first to FIGURE 1, the numeral 10 identifies one of the pole pieces of a magnetic recording head. The pole piece 10 may be formed of a plurality of laminations of a suitable and well-known type which may be suitably stacked upon each other and mounted by way of supporting means extending through the support holes 11 and 12. The pole piece 10 cooperates with a further pole piece 14 which is mounted in the center of the head assembly and has a generally I configuration. The lower projection of the pole piece 14 extends into close proximity to the lower extension of the pole piece 10 to form a gap at 15. If desired, the gap may be formed by placing a suitable small nonmagnetic metallic or insulating spacer between the adjacent pole pieces 10 and 14. The opposing side of the pole piece 14 which is opposite to the gap 15 is chamfered as indicated at 16. Electrical signals are adapted to be applied to the terminals of a coil 17 wound on the pole piece 10, and these signals will produce a flux variation in the gap 15 which may be recorded on a magnetic tape or other like medium in the vicinity of the gap 15.

Mounted in back of the recording head formed by the pole pieces 10 and 14 is a further recording head formed by a pair of pole pieces 20 and 21. These latter two pole pieces 20 and 21 have a gap 22 positioned therebetween to form the recording gap for the head. It will be noted that the gap 15 and the gap 22 are spaced apart and form what is termed a staggered gap head assembly. It should be noted that the pole piece 20 will be chamfered as at 23 in order to minimize the effect of any active pole piece in the area of the magnetic tape which might otherwise create unwanted flux variations, were the chamfer not present.

In fabricating a head of the type illustrated in FIGURE 1, it has heretofore been the practice to mount the heads in a suitable jig and then pot the same, using a plastic potting material. The effect of this will be provide a recording head having a plastic on the external surface thereof where it will engage the recording tape.

Figure 2:
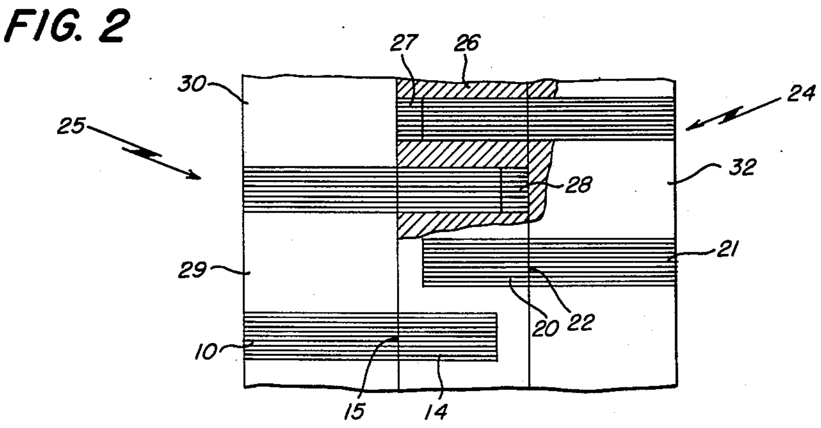
FIGURE 2 is a partial cut-away plan view of a plurality of recording heads mounted in a recording head assembly.

The staggered gap head assembly may be viewed in the plan view with FIGURE 2 wherein the pole pieces 10 and 14 are illustrated as forming the gap at 15. The pole pieces 20 and 21 are shown mounted and forming a gap at 22. Two additional recording heads are illustrated in the plan view of FIGURE 2 and are indicated generally at 24 and 25. The heads 24 and 25 have been illustrated with a portion of the metal covering which surrounds the heads removed in the cross-hatched section 26 to expose the chamfered surfaces 27 and 28.

In forming the overall assembly illustrated in FIGURE 2, three separate units are assembled separately and then fastened together. The assemblies are separated along the gap lines such that the pole piece 10 and the related portion of the recording head 25 are formed in a single assembly by taking the pole pieces and separating them by suitable spacers 29 and 30. Similarly, the pole piece 21 and the corresponding pole piece of the head 24 are mounted in assembly with a suitable spacer 32 positioned therebetween. A third portion comprises the center pole pieces 14, 20, and the related portions of the recording heads 24 and 25. These pole pieces are assembled in a unitary structure so that the pole pieces of each recording head are in alignment and define a recording gap, which gap may be used for purposes of recording electrical signals applied to the coils wound on the associated pole pieces. The three individual sections of the recording head are adapted to be cemented or bonded into position after the same have been formed.

Figure 3:
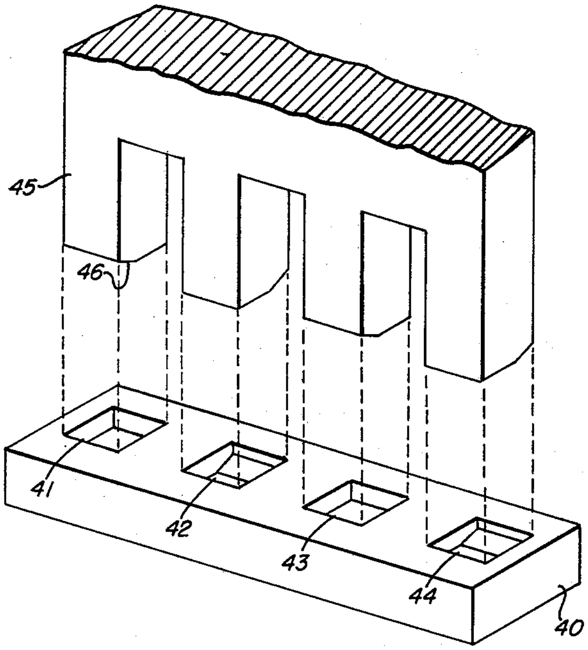
FIGURE 3 is an illustration of one manner in which the mounting block for the center pole pieces may be formed.

FIGURE 3 illustrates the manner in which the center section of the recording head assembly has the associated metal surface formed therefor. The numeral 40 identifies a metallic block, which may be brass, and which is adapted to have a plurality of impressions 41, 42, 43, and 44 formed therein by way of a suitable die 45. The die 45 is arranged to have the same end cross-sectional configuration as the pole piece 14, for example. It will be seen to include a flat end portion as well as a chamfered section, such as the chamfered section 46. The chamfered sections are positioned on alternate sides of each of the die projections for the reason that the center pole pieces are adapted to be reversed in their position in which they are positioned with respect to each other in the final assembly.

Figure 4:
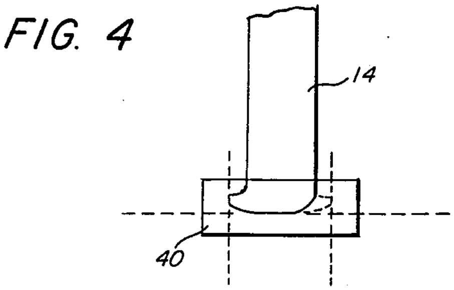
FIGURE 4 is an illustration of the areas in which machining must take place in order to effect the principles of the present invention.

After the die 45 has made the impressions 41 through 44 on the block 40, the center pole pieces may be dropped into position and cemented or bonded there by a suitable bonding material. Once the pole pieces have been cemented in position, what is now excess metal of the block 40 will be machined off in the manner indicated in FIGURE 4. The machining lines in FIGURE 4 are identified by the dotted lines. Thus, machining takes place along the end of the pole piece as well as along the sides of the pole piece, up to the point where the pole piece will be exposed to define the recording gap.

After the center pole piece has been machined off in the manner indicated in FIGURE 4, it is then ready for mounting with the external sections in the manner indicated in FIGURE 2. The entire head assembly may then be suitably ground to provide the desired arcuate surface and to machine off any excess unwanted metal. The end product following this final machining operation will be a recording head having metal over the entire surface thereof except at the points where the laminations and the various sections have been cemented or bonded together.

The recording head assembly resulting from this method of construction has been found to be extremely reliable and of very long life. Further, the resultant head will not unduly wear the magnetic tape associated therewith in a recording or reading operation.

While, in accordance with the provisions of the statutes, there have been illustrated and described the best forms of the invention known, it will be apparent to those skilled in the art that changes may be made in the process and apparatus described without departing from the spirit of the invention as set forth in the appended claims and that in some cases, certain features of the invention may be used to advantage without a corresponding use of other features.

Having now described the invention, what is claimed as new and novel and which it is desired to secure by Letters Patent is:

1. The method of making a portion of a magnetic recording head assembly having a plurality of pole pieces each having a linear recording edge on one end thereof which comprises forming in a nonmagnetic metal block a series of aligned depressions uniformly displaced and conforming to the contour of the ends of a plurality of pole pieces so that the recording edges of said pole pieces when positioned will lie in parallel planes, bonding the ends of the pole pieces in position in said depressions, and machining at least a portion of said block away to form a continuous metallic recording surface incorporating the exposed ends and the linear recording edges of said pole pieces.

2. The method of making a portion of a magnetic recording head assembly having a plurality of pole pieces each having a linear recording edge on one end thereof which comprises stamping in a nonmagnetic metal block a series of aligned and uniformly displaced depressions conforming to the contour of the ends of a plurality of pole pieces so that the recording edges of said pole pieces when positioned therein will lie in parallel planes, bonding the ends of the pole pieces in position in said depressions, and machining at least a portion of said block away to form a continuous metallic recording surface incorporating the exposed ends and the linear recording edges of said pole pieces.

3. The method of making a magnetic recording head assembly having a plurality of pole pieces each having a linear recording edge formed on one end thereof and each defining a separate recording channel which comprises forming in a nonmagnetic metal block a series of aligned and uniformly displaced depressions conforming to the contour of the ends of a plurality of pole pieces so that the recording edges of said pole pieces when positioned therein will lie in parallel planes, bonding the ends of the pole pieces in position in said depressions, and machining at least a portion of said block away to form a continuous metallic recording surface incorporating the exposed ends and said recording edges of said pole pieces.

4. The method of constructing a portion of a magnetic recording head having a plurality of recording channels where each head includes a pole piece having a linear recording edge on one end and a chamfered edge on the side opposite said recording edge which comprises forming in a nonmagnetic metal block a plurality of aligned pole piece receiving impressions arranged so that when positioned the recording edge of each pole piece will lie in a plane that is parallel with the planes extending along the recording edges of the other pole pieces, bonding said pole pieces in said impressions, and machining portions of said block away from said pole pieces on the ends thereof and flush with the recording edge thereof to form a continuous metallic recording surface incorporating said ends as exposed and said recording edges.

5. The method of constructing a portion of a magnetic recording head having a plurality of recording channels where each head assembly includes a pole piece having a recording edge on one end and a chamfered edge on the side opposite said recording edge and where said pole pieces are adapted to be positioned so that adjacent pole pieces have their recording edges on opposing sides and the recording edges on each side lie in parallel planes, which comprises forming in a nonmagnetic metal block a plurality of aligned pole piece receiving impressions each with a chamfer receiving portion, bonding said pole pieces in said impressions, and machining portions of said block away from said pole pieces on the ends thereof and flush with the recording edges thereof to form a continuous metallic recording surface incorporating said ends and said recording edges.

6. The method as claimed in claim 5 wherein each of said pole pieces has mounted against the recording edge thereof a cooperating pole member which forms with said pole piece a recording gap.

7. The method of constructing a magnetic recording means having a plurality of recording heads for a plurality of recording channels where each head includes a pole piece having a recording edge on one end and a chamfered edge on the side opposite said recording edge which comprises forming in a nonmagnetic metal block a plurality of aligned pole piece receiving impressions, positioning and bonding said pole pieces in said impressions so that the recording edges of at least every other pole piece are aligned in a common plane, machining the excess portions of said block away from said pole pieces on the ends thereof and flush with the recording edge thereof to form all of said pole pieces in a unitary structure having a continuous metallic recording surface incorporating said ends and said recording edges, positioning and bonding secondary pole pieces each having an exposed recording edge so that the recording edge of each of said secondary pole pieces matches the recording edge of said pole pieces to form a plurality of recording heads.

References Cited in the file of this patent

UNITED STATES PATENTS

| | | |
|---|---|---|
| 2,347,501 | Penker | Apr. 25, 1944 |
| 2,636,856 | Suggs et al. | Apr. 28, 1953 |
| 2,763,729 | Camras | Sept. 18, 1956 |
| 2,915,812 | Rettinger | Dec. 8, 1959 |